(12) United States Patent
Vangelista

(10) Patent No.: US 10,084,491 B2
(45) Date of Patent: Sep. 25, 2018

(54) ADAPTIVE SYSTEM FOR TRANSMITTING AND COMBINING RADIO FREQUENCY SIGNALS

(71) Applicant: WISYCOM S.R.L., Romano d'Ezzelino (VI) (IT)

(72) Inventor: Lorenzo Vangelista, Bassano del Grappa (IT)

(73) Assignee: WISYCOM S.R.L., Romano D'Ezzelino (VI) (IT)

( * ) Notice: Subject to any disclaimer, the term of this patent is extended or adjusted under 35 U.S.C. 154(b) by 0 days.

(21) Appl. No.: 15/551,589

(22) PCT Filed: Feb. 12, 2016

(86) PCT No.: PCT/IT2016/000035
§ 371 (c)(1),
(2) Date: Aug. 16, 2017

(87) PCT Pub. No.: WO2016/132391
PCT Pub. Date: Aug. 25, 2016

(65) Prior Publication Data
US 2018/0013453 A1   Jan. 11, 2018

(30) Foreign Application Priority Data

Feb. 16, 2015 (IT) ................ VI2015A0044

(51) Int. Cl.
*H04M 1/00* (2006.01)
*H04B 1/04* (2006.01)

(52) U.S. Cl.
CPC ................ *H04B 1/0458* (2013.01)

(58) Field of Classification Search
CPC ........ H04B 1/0458; H04B 1/38; H04B 10/40; H04B 10/50
(Continued)

(56) References Cited

U.S. PATENT DOCUMENTS 6,658,263 B1   12/2003   Ke et al.
6,763,062 B1*   7/2004   Kohno ............... H01Q 3/2605
375/219

(Continued)

FOREIGN PATENT DOCUMENTS

WO   2008/111886 A2   9/2008
WO   2008/111886 A3   9/2008

OTHER PUBLICATIONS

Italian Patent Office Search Report and Written Opinion dated Jun. 8, 2015 (partially in English).
(Continued)

*Primary Examiner* — Sonny Trinh
(74) *Attorney, Agent, or Firm* — Hedman & Costigan, P.C.; James V. Costigan; Kathleen A. Costigan

(57) ABSTRACT

A system for transmitting (IMP) and combining radio frequency signals, comprising one or more RF input signals transmitters (IN), which employ a respective controlled amplifier (AC) and sends a respective RF output signal; the RF output signals are combined into a combiner device (C), which includes at least one combiner (CP), for example a passive combiner, and from here sent to at least an antenna connector (CA). Furthermore, both the combiner device (C) and the transmitters are equipped with electronic circuits (UL, LC), allowing the combiner device (C) and the transmitters communicating with each other using only one connecting device (CC), which transmits the power signal and RF signal to be transmitted.

1 Claim, 3 Drawing Sheets

(58) Field of Classification Search
USPC ..... 375/219, 220, 221; 455/273, 561, 562.1; 370/328, 336, 339, 461
See application file for complete search history.

(56) References Cited

U.S. PATENT DOCUMENTS

| | | | |
|---|---|---|---|
| 7,502,355 B2* | 3/2009 | Bednekoff | H04B 1/18 370/328 |
| 2006/0199592 A1 | 9/2006 | Bednekoff et al. | |

OTHER PUBLICATIONS

Notification of Transmittal of the International Search Report and the Written Opinion of the International Searching Authority for PCT/IT2016/000035 dated Jul. 29, 2016.

* cited by examiner

ADAPTIVE SYSTEM FOR TRANSMITTING AND COMBINING RADIO FREQUENCY SIGNALS

CROSS-REFERENCE TO RELATED APPLICATIONS

The present application is a Section 371 application of PCT/IT2016/000035.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

REFERENCE TO A "SEQUENCE LISTING," A TABLE, OR A COMPUTER PROGRAM LISTING APPENDIX SUBMITTED ON A COMPACT DISC AN DAN INCORPORATION-BY-REFERENCE OF THE MATERIAL ON THE COMPACT DISK

Not Applicable

STATEMENT REGARDING PRIOR DISCLOSURES BY THE INVENTOR OR A JOINT INVENTOR

Not Applicable

BACKGROUND OF THE INVENTION

The present invention generically refers to the RF signals transmitting, for example to the systems used during transmitting and/or receiving radio-microphone signals.

More in particular, the invention concerns a typical installation used in the systems of receiving-transmitting, where more transmitting bases (each approved for a maximum power output, in relation to current regulation in the Country of approval) are "summed" with each other for being connected to a sole transmitting antenna, thus simplifying the installation of the system; this occurs by means of a device which is generally called adder or combiner, which may be realized by various design techniques, each of which has drawbacks and/or limits, limits which the following invention is meant to remove.

The approving regulations in the different countries limit the output level of the transmitters, limiting the maximum power at the output radio frequency, with possibly varying limits in the different frequency bands.

The manufacturers of the transmitters typically realize such devices starting from only one hardware design, limiting then the performance of the same by implementation of firmware/software (for example, loading configuration files), which are inserted in the control firmware/software of the apparatus, so that the final performance complies to the regulations of the Country where the apparatus is sold.

The total performance of the system is thus influenced by the combiner device; in particular if this is passive, in such case, as it is known, a part of the power is dissipated in the internal circuits, making only a fraction of the power from the transmitter available for the antenna.

As an alternative, combining devices with amplification stages inside, which retrieve the loss of the adder circuit, are commonly realized, but even this solution has remarkable drawbacks.

BRIEF SUMMARY OF THE INVENTION

A simplified representation of a system IMP for transmitting and combining radio frequency signals according to the state of the art is shown in the FIGS. 1, 2 and 3 herewith attached, where different known configurations are schematically shown and, for the sake of simplicity, the transmitters have been omitted and where only the inputs IN of the combiner have been indicated, to which the outputs of the above said transmitters are connected.

In general, a combiner device has N inputs IN (typically 8) and, according to a first configuration, shown in FIG. 1 and indicated as configuration C1, the input signals IN (coming typically from transmitters which can reach power, for example of 2 W, which exceed the limits of the regulations, but which are limited by a software, precisely for complying the regulations, a power of about a hundred of mW) are added, by the passive combiner CP, by means of various different circuit techniques, including the resistive configuration or Wilkinson type which are the more known.

Considering a non-limiting example of two input signals, in case of resistive configuration, the output signals from the passive combiner CP lose each 6 dB, while in case of Wilkinson configuration lose each 3 dB. The configuration C1, according to the known art, shown in FIG. 1 herewith attached, has the advantages of a decreased cost, of the constructive simplicity and of the reliability, but has a very high loss of signal.

A second known configuration, indicated with C2 and schematically shown in FIG. 2 herewith attached, provides a circuit diagram similar to the previous one with, in addition, the use of an amplifier A2, which has the sum signal as input and which amplifies all together the input signals IN (the configuration C2 is named also as "Active combiner with a single amplification"), as well as the use of a general power signal block AL2.

The configuration C2, according to the known art, retrieves the loss of signal, in respect with the configuration C1, nevertheless it is highly expensive, causes a reduction of reliability (only one "point of failure" exists, which endangers the operation of the whole system), the need of a very powerful amplifier for dealing with all signals simultaneously and a deterioration of the intermodulation characteristics of the system.

Another known configuration, indicated with C3 and schematically shown in FIG. 3 herewith attached, provides, in addition to the general power signal unit AL3, the use of an amplifier A3 for each input IN, which increases the signal power, in order to compensate for the one which will be lost subsequently (the configuration C3 is also named "active combiner with separate amplifications").

The configuration C3, according to the known art, allows recovering the loss of signal and, in respect with the configuration C2, part of the "points of failure" are distributed along the individual transmitters, nevertheless it is highly expensive, needs N amplifiers (one for each input IN and everyone pretty powerful), may worsen the characteristics of intermodulation of the system and has still however "points of failure" (for example, the general power signal unit AL3), which, in case of failure, can block the whole system.

A system for transmitting and combining RF signals having the technical features of the preamble of the appended claim 1 is also known from U.S. Pat. No. 6,658,263B1

Aim of the present invention is thus overcome the above mentioned drawbacks of the known art and, in particular, realizing a system for transmitting and combining radio frequency signals, which is extremely reliable and which allows obtaining better performances, than the known art, in terms of intermodulation between the transmitters, limiting, at the same time, the total costs of construction and operation.

This and other aims, which can be better assessed in the course of treatment, are achieved by a system for transmitting and combining radio frequency signals, according to the claim 1 herewith attached.

Other technical features of detail of the combiner device which is subject matter of the invention are contained in the relevant dependent claims.

In an advantageous manner, the present invention allows realizing components (transmitters and combining devices) of a system (the system for transmitting and combining radio frequency signals), which are able to interface with each other, so as the output power from the transmitters is automatically adjusted for recover the loss of the passive combiner.

This also allows realizing multi-channel systems, where it is possible replacing the N antennas (one for each transmitter) with a sole antenna for installation, recovering automatically the loss of the passive combiner and obtaining an antenna emitting the maximum power which is permitted under applicable rules, thus simplifying the implementation of the system; furthermore, the design allows obtaining better performance in terms of intermodulation between the transmitters.

The utility of the invention is independent of the typical application which is described in the following and may be applied, similarly, for example (but not only) in case we want to use a power splitter for supplying two transmitting antennas which radiate towards two places or two different directions.

In this case, thanks to the technology which is subject matter of the present invention, using only one amplifier, instead of two or more, is possible, having however the maximum power permitted under applicable rules at the antenna connectors (as if there were N standard amplifiers, in a number equal to the number of the inputs, each with its antenna).

This allows creating areas, where radiofrequency signal is transmitted, exactly in isofrequency, which allows also removing the fading problems of the received signal, such phenomenon being due to the interaction (beat) between the electromagnetic fields radiated by the different antennas.

BRIEF DESCRIPTION OF THE SEVERAL VIEWS OF THE DRAWINGS

Further features and advantages of the present invention will become more apparent from the following description, relating to a preferred embodiment of the combiner device for radio frequency signals, which is subject matter of the present invention, provided with an indicative and illustrative, but not limitative, purpose and with the help of the attached tables of drawings, in which:

the FIGS. 1, 2 and 3 show as many schematic examples of circuit configurations relating to systems for transmitting and combining radio frequency signals, according to the known art;

Figure 4:
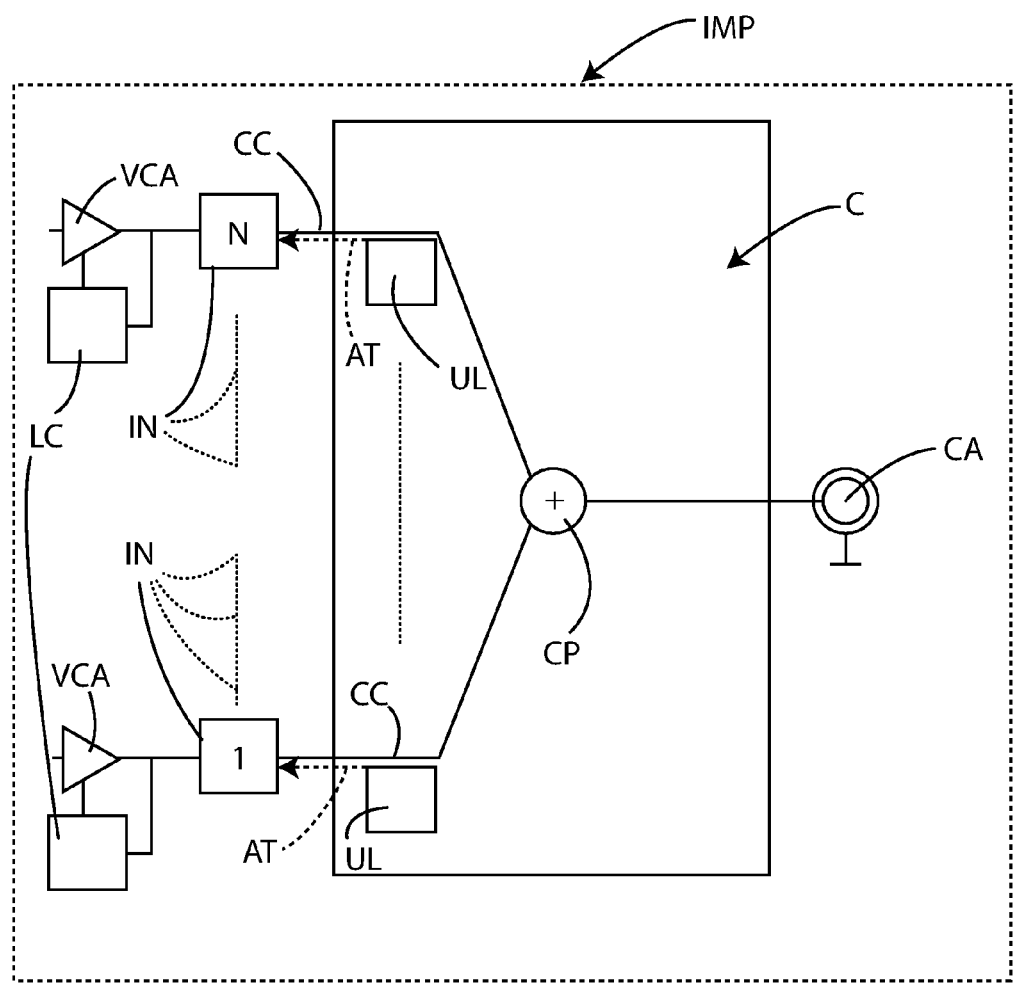
Figure 5:
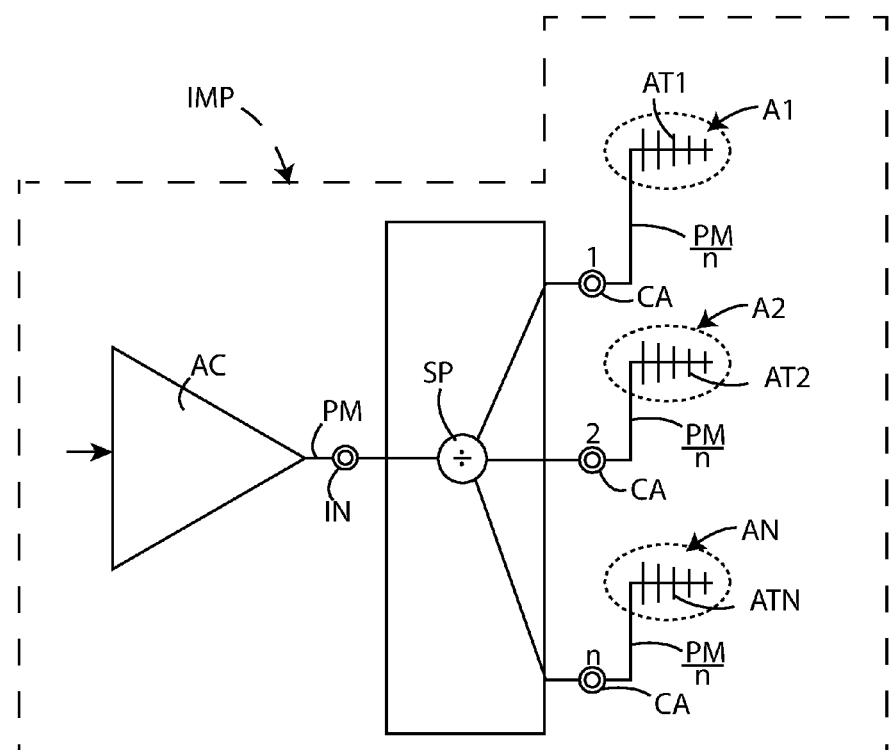
Figure 6:
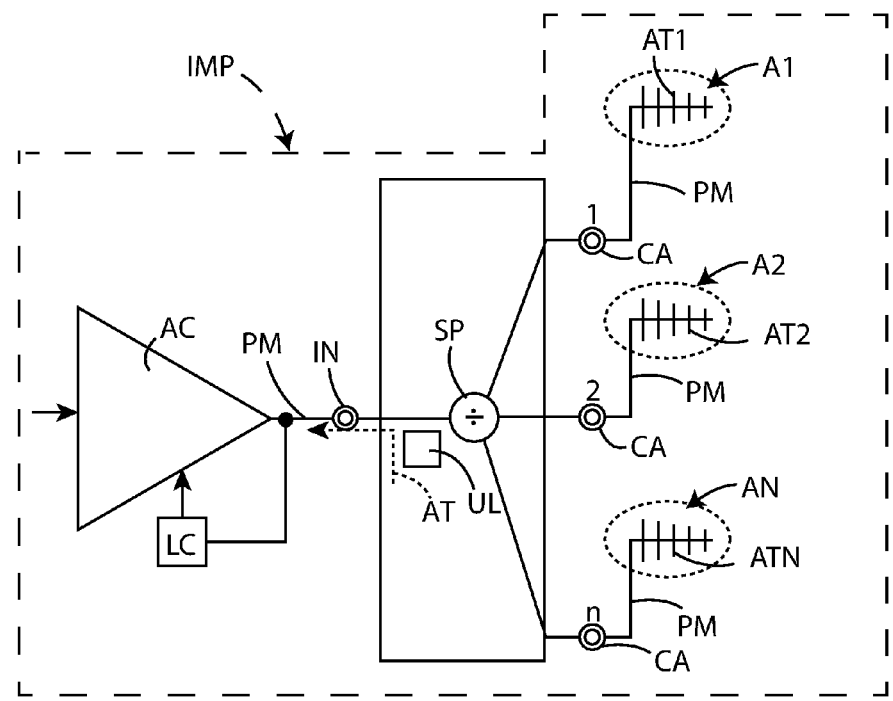

the FIG. 4 shows schematically a circuit configuration of a system for transmitting and combining radio frequency signals, according to the present invention;

the FIG. 5 shows schematically an alternative circuit configuration of a system for transmitting and combining radio frequency signals, realized according to the known art;

the FIG. 6 shows schematically a circuit configuration of the system for transmitting and combining radio frequency signals shown in FIG. 5, realized according to the present invention.

DETAILED DESCRIPTION OF THE INVENTION

With particular reference to the FIG. 4 herewith attached, the system IMP for transmitting and combining radio frequency signals, according to the present invention, has a series of transmitters at the inputs IN, which employ a respective controlled amplifier AC, and which send a respective RF output signal, which are in turn combined into the passive combiner CP of a combiner device C.

Both the combiner C and the transmitters alike are equipped with a circuit, which allows communicating with each other using the same connection (typically a coaxial cable CC), which carries the power signal and RF signal to be transmitted.

In particular, upstream of the inputs IN and in parallel to the respective amplifier CA, there is an electronic control circuit LC (one for each input IN), which shares, together with the power signal to be transmitted to the antenna connector CA, a tele-power signal and a detector of the return signals, which return signals are properly decoded, according to a proper protocol.

The respective electronic control circuits LC detect indications of the applied attenuation and thus, in this way, each transmitter is informed about the kind of combiner C which is connected (and about the respective loss of signal), so as to adapt the output power and as the antenna emits the maximum power which is permitted under applicable rules.

Equally, the combiner C equipped with the technology according to the present invention has inside it respective control circuits UL (one for each input IN) which, supplied by the transmitter, redirect to the transmitter all the information concerning its technical features and, in particular, send towards the respective inputs IN an indication of the applied attenuation AT (RF loss).

The above said control circuits UL may also encode all the information which the manufacturer requires.

Furthermore, the transmitters may be installed in accessible places for the technicians who will arrange their management, while the combiner C may be installed in a less accessible place.

By means of the technology which is described according to the present invention, thus having the information regarding the combiner C, according to what was encoded in the protocol (as, for example, the RF loss, the operating status, the temperature, the signal/noise ratio or whatever intended by the manufacturer) available (for example, on the display from the transmitter) is possible.

Figure 1:
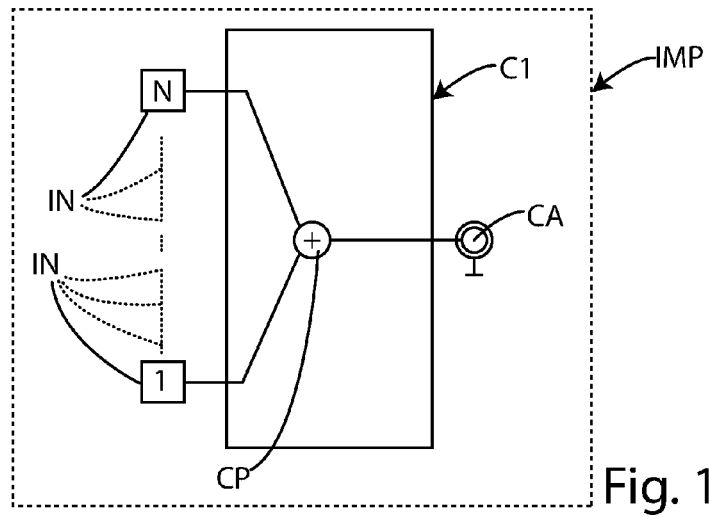
Figure 2:
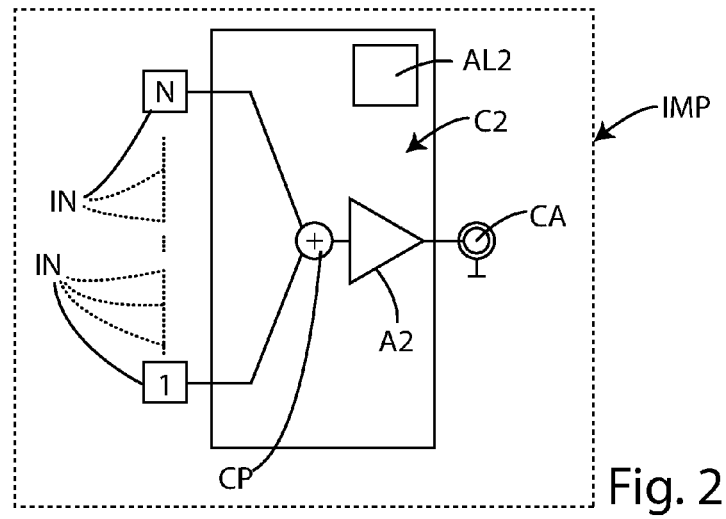
Figure 3:
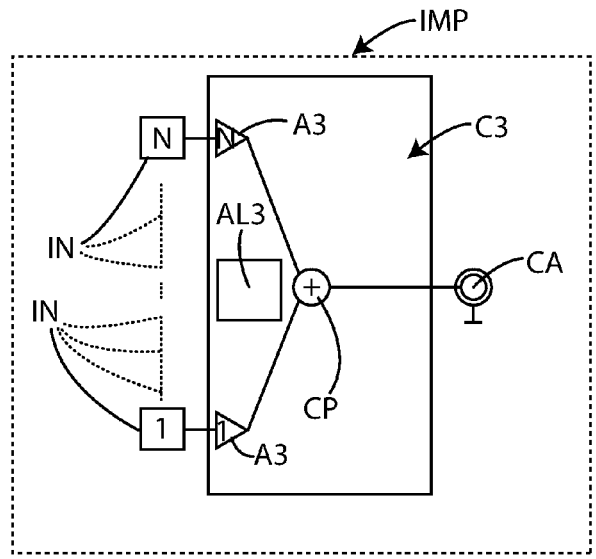

Furthermore, the system is transparent towards the apparatuses which are not equipped with this technology, since if it is not on one of the apparatuses (or if it fails or is disabled)

the system for such apparatus continues to operate and acts as a traditional system, as the passive combiner C1 shown in FIG. 1.

On this basis, the application of a system for communication between transmitter and combining devices allows the exchange of data between the two apparatuses, so as to facilitate its installation; thus an automatic system for adapting the output power from the transmitter in order to recover the loss of signal caused by the attenuation introduced by the combiner is obtained, just on the basis of the indication of the attenuation AT.

Furthermore, since the system for communication introduced according to the present invention uses the same coaxial cable CC which supplies the antennas, the above said system is automatically enabled once the devices are connected, with no need of further connections.

Finally, the system according to the invention allows automatically adjusting the output level of the transmitting apparatus, so as to obtain a constant power, according to the regulations in force, at the output connector (typically at the antenna connector CA), recovering the attenuation which is introduced by the combiner CP interposed between the transmitting apparatus and the antenna.

As already previously mentioned, the invention may be applied, similarly, for example in case a power splitter SP is used for supplying more transmitting antennas AT1, AT2, ATN, which radiate in respective places or different directions A1, A2, AN; for example, in FIG. 5 herewith attached, one circuit diagram of this kind, realized according to the known art, is shown using a splitter SP and wherein the maximum power PM of the controlled amplifier AC complying with the regulations is splitted, at each transmitting antenna AT1, AT2, ATN, for the number n of provided transmitting antennas (PM/n).

In this system, thanks to the technology which is subject matter of the present invention (as shown in detail in FIG. 6 herewith attached), using only one controlled amplifier AC, instead of two or more, is possible, having however at the antenna connectors CA the maximum power PM of the controlled amplifier AC complying with the regulations (as if there were n amplifiers standard, in a number equal to the number of the inputs IN, each with its antenna AT1, AT2, ATN).

This allows creating areas A1, A2, AN, where a radiofrequency signal is transmitted, exactly in isofrequency, which allows also removing the fading problems (fading) of the received signal, such phenomenon being due to the interaction (beat) between the electromagnetic fields radiated by the different antennas AT1, AT2, ATN.

The technical features of the system for combining and transmitting radio frequency signals, according to the present invention emerge clearly from the description, as clear are the respective advantages.

In particular, they are the following:

the whole communication and the power signal of the system occur by means of the input conductor to the combiner and thus further connections are not needed;

since the input conductor to the combiner is typically a coaxial cable, the system is intrinsically protected from the external electromagnetic disturbances, which makes it very safe;

the devices (transmitter and combiner) equipped with the present technology may not be tampered with by the user (for example, by modifications of the hardware in order to increase the radio frequency emitted power) and thus circumventing the current legislation is not possible;

since the power signal is emitted by means of the input conductor to the combiner and each transmitter supplies its own input to the combiner, if, by design choice, there are combining devices with different losses in the different inputs, the respective transmitter dynamically adapts during the connection;

the breaking of a transmitter, of the respective connection or of an input of the combiner does not affect the behaviour of the other inputs or installation channels.

It is clear, finally, that many other variations may be made to the system for transmitting and combining radio frequency signals in question, without for this departing from the novelty principles inherent in the inventive idea which is expressed here, as it is clear that in the practical implementation of the invention, the materials, the shapes and the sizes of the illustrated details can be any, according to requirements, and can be replaced with other technically equivalent.

The invention claimed is:

1. System for transmitting (IMP) and combining radio frequency signals, comprising one or more RF input signals transmitters (IN), which employ a respective controlled amplifier (AC) and which send a respective RF output signal, said RF output signals from said respective transmitters being combined into a combiner device (C), which includes at least one combiner (CP), and from here sent to at least an antenna connector (CA), said combiner device (C) having one or more first electronic circuits (UL) and said transmitters being equipped with respective second electronic circuits (LC) and one or more antennas being placed downstream of said combiner device (C), wherein said first electronic circuits (UL) redirect indications of the RF attenuation (AT) towards said transmitters and said second electronic circuits (LC) detect said indications of the RF attenuation (AT), so that said combiner device (C) communicates with said transmitters using only one connecting device (CC), constituted by a coaxial cable which delivers the power signal and the RF output signal to be transmitted as to adapts its output power according to said indications of the RF attenuation (AT) communicated by said combiner device (C) wherein said second electronic circuit (LC), which is provided for each input (IN), is placed upstream of said input (IN) and in parallel to each controlled amplifier (AC) and shares a power signal to be transmitted to said antenna connector (CA), a tele-power signal and a detector for the return signals, said return signals being decoded by a given protocol and wherein said combiner device (C) has first electronic circuits (UL), one for each input (IN), which, supplied by said transmitter, redirect to said transmitter and to said inputs (IN) said indications of the RF attenuation.

* * * * *